United States Patent [19]
Takahashi

[11] Patent Number: 5,798,122
[45] Date of Patent: Aug. 25, 1998

[54] STAMPER PLATE MOUNTING DEVICE OF AN INJECTION MOLD FOR MAKING AN OPTICAL DISC SUBSTRATE

[75] Inventor: Mitsuo Takahashi, Matsudo, Japan

[73] Assignee: Seikoh Giken Co., Ltd., Chiba-ken, Japan

[21] Appl. No.: 704,321

[22] Filed: Aug. 28, 1996

[30] Foreign Application Priority Data

Nov. 28, 1995 [JP] Japan ............... 7-331229

[51] Int. Cl.$^6$ .................................... B29C 45/17
[52] U.S. Cl. .............. 425/3; 425/193; 425/810; 425/DIG. 33
[58] Field of Search .................. 925/3, 192 R, 925/193, 810, DIG. 33, DIG. 60

[56] References Cited

U.S. PATENT DOCUMENTS

| | | |
|---|---|---|
| 4,737,096 | 4/1988 | Poorten . |
| 4,907,956 | 3/1990 | Ezaki et al. .................. 425/110 |
| 5,049,053 | 9/1991 | Tabaru ........................... 425/3 |
| 5,087,184 | 2/1992 | Watanabe et al. ............. 425/3 |
| 5,326,240 | 7/1994 | Kudo et al. ............ 425/DIG. 60 |
| 5,427,520 | 6/1995 | Shimizu et al. ............. 425/556 |
| 5,593,710 | 1/1997 | Asai ............................ 425/552 |

FOREIGN PATENT DOCUMENTS

| | | |
|---|---|---|
| 2-295726A | 12/1990 | Japan . |
| 2-60502 | 12/1990 | Japan . |
| 5-185475A | 7/1993 | Japan . |

*Primary Examiner*—Jay H. Woo
*Assistant Examiner*—Ivrie A. Schwartz
*Attorney, Agent, or Firm*—Spencer & Frank

[57] ABSTRACT

A stamper plate mounting device for an injection mold for making an optical disc substrate. A stamper plate is detachably supported in a cavity hollow which is formed between a cavity side disc cavity plate and a movable disc cavity plate of the injection mold for making an optical disc substrate. A central hole is provided at the center of the disc cavity. The stamper plate mounting device has (1) means for holding the inner circumference of the stamper plate which has, on one end thereof, a flange for holding the inner circumference of the stamper plate and which is precisely fitted in the central hole from the other end thereof, and (2) permanent magnet which is buried in the bottom surface of the central hole or in the other end of the means for holding the inner circumference of the stamper plate and which has a magnetic pole in the axial direction.

8 Claims, 3 Drawing Sheets

5,798,122

STAMPER PLATE MOUNTING DEVICE OF AN INJECTION MOLD FOR MAKING AN OPTICAL DISC SUBSTRATE

BACKGROUND OF THE INVENTION

1. Field of the Invention

The present invention relates to a stamper plate mounting device of an injection mold for making an optical disc substrate for use in a CD-ROM or the like.

2. Description of the Related Art

Some conventional stamper plate mounting devices of injection molds for optical disc substrates are disadvantageous in that they require a complicated operation or do not permit easy removal of the stamper plates thereof; and some have such structures that they may impair the basic functions of metal molds. There has been known an injection mold for optical disc substrates which is designed to move a stamper plate holding bush by a camshaft (refer to, for example, Japanese Patent Laid-Open No. 2-295726). FIG. 3 is a cross-sectional view illustrative of a conventional injection mold for optical disc substrates which is in the middle of an injection molding process, wherein the aforesaid camshaft is used to move the stamper plate holding bush.

FIG. 4 is a schematic cross-sectional view illustrating the conventional injection mold wherein the stamper plate holding bush has been moved. In both drawings, the cavity side parts are placed, facing up; however, the metal mold may be placed sideways so that the central axis of the cavity may be horizontal, or it may also be placed upside down from that shown in the drawings.

A retainer plate 6 is provided with a cavity side disc cavity plate 4. Provided at the center of the cavity side disc cavity plate 4 is a hole 5 in which a stamper plate holding bush 2 is inserted. The bottom end of the stamper plate holding bush 2 is provided with a flange 3 which has a larger outside diameter than the central hole of the stamper plate 1. The top end of the stamper plate holding bush 2 is provided with notch 9. The retainer plate 6 rotatably supports two engaging rods 7 which engage with the aforesaid notch 9 of the bush 2. The two engaging rods 7, 7 respectively have planes 8, 8 of semicircular cross sections and they are connected so that they rotate, as shown by arrows, in synchronization. A sprue bush 10 is inserted in the central hole in the stamper plate holding bush 2; it has an injection hole 11 for injecting melted resin at the center thereof. The cavity side disc cavity plate 4 is equipped with an annular cooling water channel 12 which is in contact with the retainer plate 6. Fixed on a movable retainer plate 19 is a movable disc cavity plate 17. A punch 18 for punching a central hole in a disc substrate is supported at the center of the movable disc cavity plate 17 in such a manner that it can move up and down in the drawing.

At the beginning of injection molding, the stamper plate 1 is fitted into the stamper plate holding bush 2 and the outer circumference of the hole of the stamper plate is held by the flange 3 of the bush 2. During the injection molding, the bush 2 is retained by engagement with the planes 8, 8 of the semicircular cross sections of the two engaging rods 7, 7 as shown in FIG. 3.

Referring to FIG. 4, the procedure for detaching the stamper plate 1 will be described. The mold is opened and a disc substrate molding 20 and the two engaging rods 7 are turned in the directions of the arrows as shown in FIG. 4. This releases the planes 8 of the engaging rods 7 from the notch 9 of the bush 2 for mounting the stamper plate, thus pushing the top surface thereof in the drawing. This in turn pushes the bush 2 for mounting the stamper plate out of the central hole 5 of the cavity side disc cavity plate 4 as illustrated, enabling an operator to manually remove the stamper plate 1 while holding the stamper plate holding bush 2.

The example of the conventional stamper plate mounting device described above is designed to mechanically attach and detach the stamper plate 1 to and from the bush 2 for mounting the stamper plate,-thus ensuring the attachment and detachment of the stamper plate. This design, however, requires the use of the two rods 7, 7 and a device for driving them, thus posing the following problem. The use of the two rods and the provision of the driving device therefor in relation to a metal mold adversely affect the efforts made in achieving a smaller, lighter metal mold. Moreover, providing the rods and the driving device therefor in relation to the metal mold unavoidably adds restrictions to the design of the cooling water channel and it also requires a certain level of skill for attaching and detaching the stamper plate.

To solve the problem stated above, there has been proposed an injection mold for optical disc substrates which is equipped with a vacuum suction type stamper plate holder (refer, for example, to Japanese Patent Publication No. 260502).

In this type of metal mold, the stamper plate can be easily removed from the disc cavity plate by stopping vacuum suction. This metal mold, however, has the following shortcoming: the cavity of the metal mold for injection-molding optical disc substrates is frequently put in a vacuum state by vacuum suction before filling the cavity with melted resin in order to improve the uniformity of the density of the melted resin charged in the cavity. In this case, the rear surface of the stamper plate and the cavity are vacuumized to the same level and the suction force on the rear surface of the stamper plate does not work. This leads to a danger in that the stamper plate comes off a cylindrical bush due to the vibration of the molding machine operating at high speed or a shock applied to the molding machine. Another problem is the need for driving a vacuum pump at all times as long as a stamper plate is mounted even when the molding operation is interrupted.

There is also a magnetic attraction type metal mold for molding disc substrates as disclosed in Japanese Patent Laid-Open No. 5-185475. This type of metal mold makes use of the fact that the stamper plate is made of nickel having high permeability; a solenoid coil electromagnet or magnet shaped like a disc is buried in the entire surface of a stamper plate mounting surface of the disc cavity plate on the stamper plate side so as to magnetically attract the stamper plate. The design is advantageous in that the structure of the metal mold is simpler since it does not use a vacuum pump.

This type of metal mold, however, has the following shortcomings. Firstly, the disc cavity plate uses martensite-based stainless steel which is subjected to heat treatment to hardness of $H_R$ C55 to 60 and further to corrosion-resistance treatment to hardness of $H_v$ 1800 or more in order to protect the surface of the disc cavity plate from scratches and corrosion. In addition, the roughness of the surface must be finished to 10 nm or less. Therefore, it is technically extremely difficult to satisfy the above requirements in embedding a soft magnet material in the surface of the disc cavity plate.

Secondly, the heat controlling technique which provides a uniform cooling rate for the disc cavity plate is as important as the aforesaid selection of the material in ensuring the quality of the disc substrates. It is extremely difficult to assure satisfactory molding functions in the presence of the magnet between the cooling water channel provided at the back surface of the disc cavity plate and the surface of the disc cavity plate.

SUMMARY OF THE INVENTION

Accordingly, it is an object of the present invention to provide a stamper plate mounting device of an injection mold for an optical disc substrate, which has a simple structure and which allows a stamper plate to be easily attached or detached without impairing the fundamental functions of the molding machine.

To this end, according to the present invention, there is provided a stamper plate mounting device of an injection mold for an optical disc substrate;

wherein a stamper plate havinfg an aperture therein is detachably supported in a cavity hollow which is formed between a cavity side disc cavity plate and a movable disc cavity plate of the injection mold for the optical disc substrate; comprising:

a central hole provided at the center of a disc cavity;

means for holding the inner circumference of the stamper plate, which means has a flange for holding the inner circumference of the stamper plate on one end thereof and which is precisely fitted in the central hole from the other end thereof; and a permanent magnet which is buried in the bottom surface of the central hole-or in the other end of the means for holding the inner circumference of the stamper plate and which has a magnetic pole in the axial direction;

wherein at least a surface confronting the permanent magnet is composed of a ferromagnetic material, so that the stamper plate is attached to the cavity by the attraction of the permanent magnet when the means for holding the inner circumference of the stamper plate is inserted in the central hole.

In a preferred form, the permanent magnet mentioned above is cylindrical and it is embedded in the other end surface of the means for holding the inner circumference of the stamper plate, so that it works on a bottom surface of the central hole of the aforesaid cavity plate.

In another preferred form, the permanent magnet can be buried in the bottom surface of the central hole of the cavity plate so as to work on the other end surface of a means for holding the inner circumference defining the aperture in the stamper plate.

In a further preferred form, the magnet material for the permanent magnet may be of a neodymium (Ne—Fe—B) type, a samarium cobalt (Sm—Co) type, or alnico (Al—Ni—Co) type.

In another preferred form, the body of the means for holding the inner circumference of the stamper plate has an outside diameter surface which precisely fits into the central hole of the cavity plate; and it may be provided with a flange which is larger than the aforesaid outside diameter surface.

The means for holding the inner circumference of the stamper plate is constituted by an inner circumference bush and an outer circumference bush. One end of the inner circumference bush is provided with an outside diameter surface, which precisely fits in the aperture in the stamper plate, and a flange which is larger than the aperture in the stamper plate; the outer circumference is provided with an external thread. The outer circumference bush has an internal thread, which engages with the external thread and which is formed on the inner circumferential surface, and also the outside diameter surface which can be inserted in or withdrawn from the central hole of the cavity side disc cavity plate.

DESCRIPTION OF THE PREFERRED EMBODIMENTS

Figure 1:
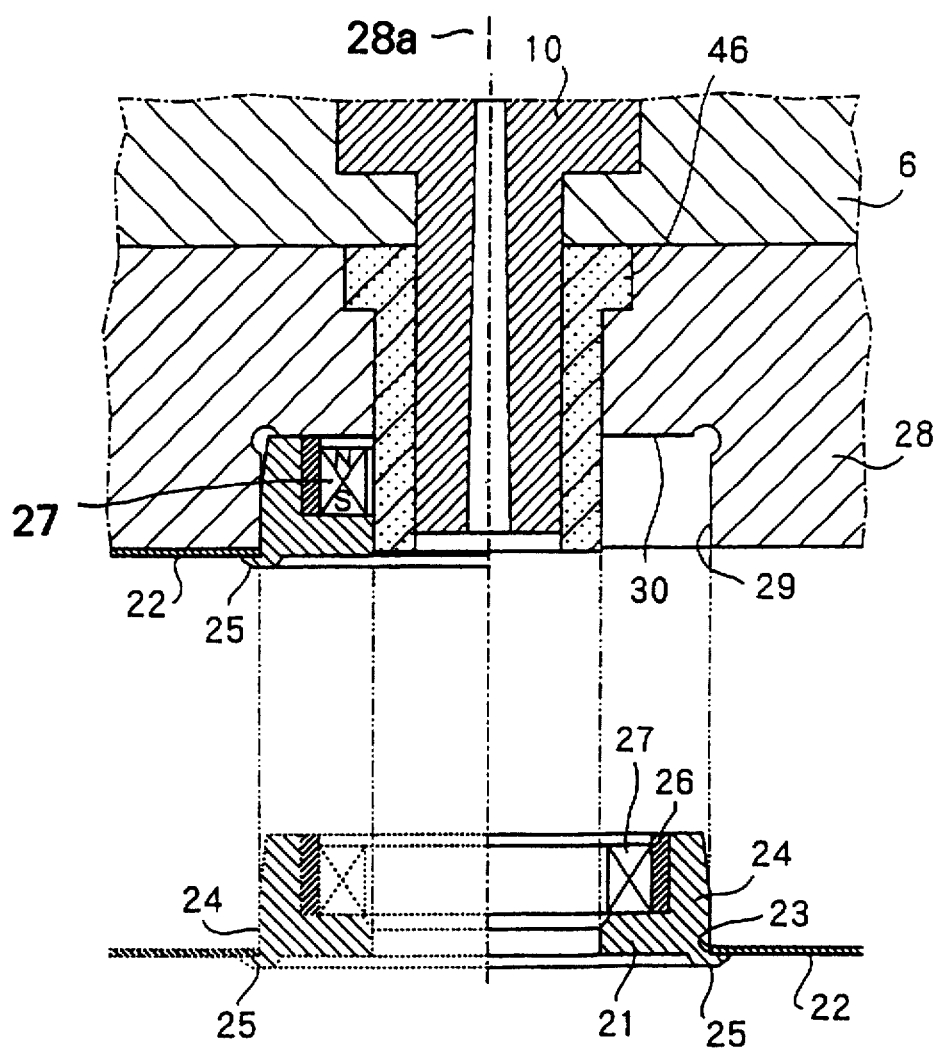
FIG. 1 is a cross-sectional view of a first embodiment of a stamper plate mounting device of an injection mold for making an optical disc substrate in accordance with the present invention.

FIG. 1 is a cross-sectional view of a first embodiment of a stamper plate mounting device of an injection mold for making an optical disc substrate in accordance with the present invention. To simplify the description, a state wherein the stamper plate has been attached is shown on the left side of FIG. 1 and a state wherein the stamper plate has not yet been attached is shown on the right side of FIG. 1. A hollow is formed in a cavity located between a cavity side disc cavity plate 28 having a longitudinal axis 28a and a movable disc cavity plate (not shown) and melted resin is injected via a sprue bush 10, thereby injection-molding an optical disc substrate. The cavity side disc cavity plate 28 is provided on a retainer plate 6 and a hole 29 is provided at the center of the cavity side disc cavity plate 28. At least a bottom surface 30 and the circumferential surface of the hole 29 must be composed of a ferromagnetic material. A cylindrical member 46, which supports the sprue bush 10 onto the cavity side disc cavity plate 28, is composed of a nonmagnetic material or a weak magnetic material, so that it exhibits higher magnetoresistance than the ferromagnetic material.

A flange 25, which is larger than a central hole 23 of a stamper plate 22, is provided on one end of a stamper plate mounting bush or holding means 21 for holding the inner circumference of the stamper plate. The outside diameter surface 24 of the holding means 21 is precisely fitted into the central hole 23 of the stamper plate 22 and the central hole 29 of the cavity side disc cavity plate 28.

The other end of the holding means 21 for holding the inner circumference of the stamper plate is equipped with a cylindrical permanent magnet 27 which generates a magnetic flux applied to the bottom of the disc cavity. The permanent magnet 27 is, for example, an annular neodymium (Ne—Fe—B) permanent magnet wherein the north pole is on the upper side and the south pole is on the lower side in the drawing. The permanent magnet 27 is buried in the holding means 21 for holding the inner circumference of the stamper plate via a ferrite-based stainless bush 26, which is composed of a nonmagnetic material rather than a ferromagnetic material. As the permanent magnet, a samarium cobalt (Sm-Co) type or alnico (Al—Ni—Co) type permanent magnet may be used in place of the neodymium type.

To fit the stamper plate 22 in the central hole 29 of the disc cavity plate 28, the stamper plate 22 is first fitted onto the stamper plate mounting bush means or holding 21, then fitted in the central hole 29 of the disc cavity plate 28. This creates a magnetic circuit shown on the left side in FIG. 1 (the north pole of the permanent magnet 27→ gap→ the bottom surface 30 of the cavity side disc cavity plate 28→ the outer wall circumference of the hole of the cavity side disc cavity plate 28 → the outer portion of the holding means 21 for holding the inner circumference of the stamper plate 22→the nonmagnetic member 26 which has been inserted in the holding means 21 for holding the inner circumference of the stamper plate→the south pole of the permanent magnet 27). The magnetic circuit generates attracting force between the holding means 21 for holding the inner circumference of the stamper plate 22 and the cavity side disc cavity plate 28.

To detach the holding means 21 for holding the inner circumference of the stamper plate, a means (not shown) for generating a magnetic force which is stronger than that of the permanent magnet 27 is actuated to apply the magnetic force to the holding means 21 for holding the inner circumference of the stamper plate so as to cancel the magnetic attraction between the holding means 21 for holding the inner circumference of the stamper plate and the bottom surface 30 of the cavity side disc cavity plate 28, thereby detaching the means 21. As an alternative, instead of using the magnetic force generating means, compressed air may be supplied between the holding means 21 for holding the inner circumference of the stamper plate and the cavity side disc cavity plate 28 in order to push the holding means 21 out.

Figure 2:
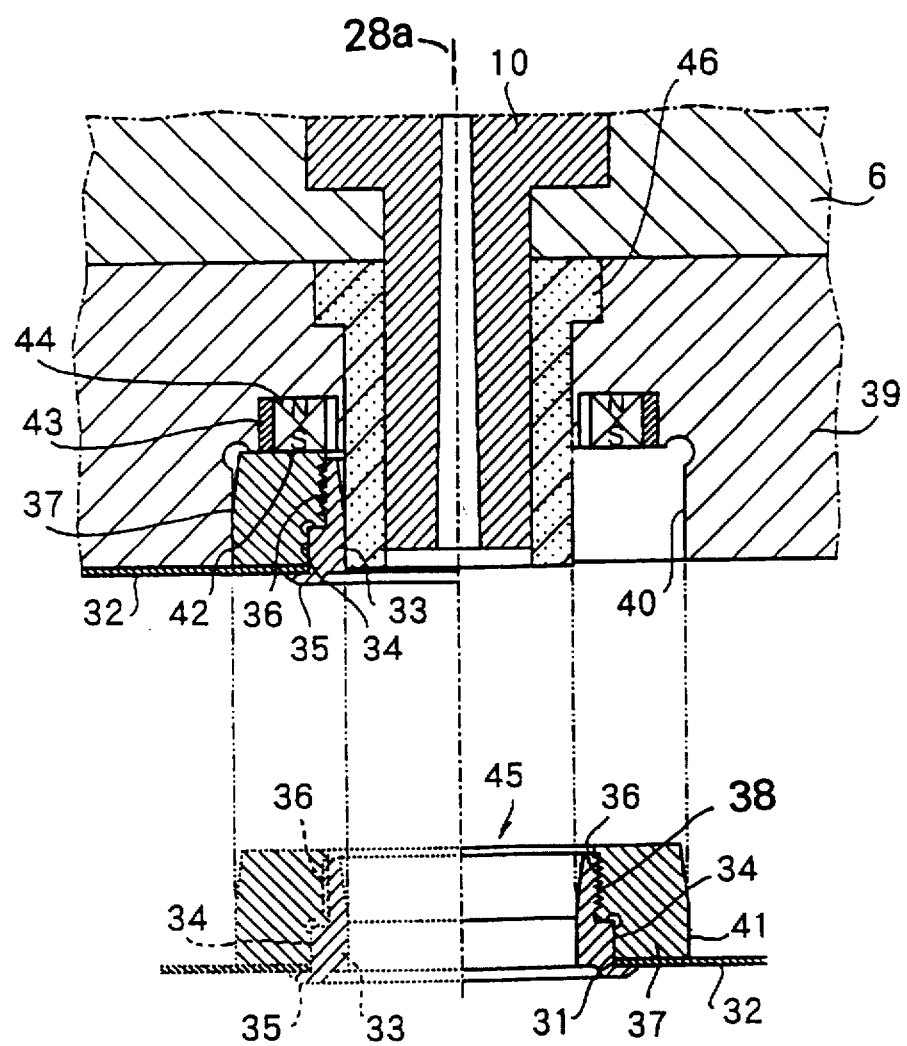
FIG. 2 is a cross-sectional view of a second embodiment of a stamper plate mounting device of an injection mold for making an optical disc substrate in accordance with the present invention.

FIG. 2 is a cross-sectional view of a second embodiment of the stamper plate mounting device of the injection mold for the optical disc substrate in accordance with the present invention. The left half of the drawing shows a state wherein stamper plate 32 has been mounted. A hole 40 is provided at the center of a disc cavity plate 39. An annular permanent magnet 44 is disposed on a bottom surface 42 of the hole 40. The annular, cylindrical permanent magnet 44 made of neodymium (Ne—Fe—B) is buried in the bottom of the disc cavity plate 39 via a bush 43 composed of a nonmagnetic material. As the permanent magnet, a samarium cobalt (Sm—Co) type or alnico (Al—Ni—Co) type permanent magnet may be used in place of the neodymium type.

A means 45 for holding the inner circumference of the stamper plate 32 is constituted by an inner circumference bush 33 and an outer circumference bush 37. One end of the inner circumference bush 33 is provided with an outside diameter surface 34, which precisely fits in a central hole 31 of the stamper plate 32, and a flange 35 which is larger than the central hole 31 of the stamper plate 32. The outer circumference is further provided with an external thread 36. The outer circumference bush 37 is made of a ferromagnetic material. The bush 37 has an internal thread 38, which engages with the external thread 36 formed on the inner circumferential bush 33 surface, and an outside diameter surface 41 which can be inserted in or withdrawn from the central hole 40 of the cavity side disc cavity plate 39.

The procedure for fitting the stamper plate 32 of this embodiment in the central hole 40 of the cavity side disc cavity plate 39 is as follows: firstly, the stamper plate 32 is fitted onto the outside diameter surface 34 of the inner circumference bush 33; secondly, the inner circumference bush 33 is attached to the outer circumference bush 37, then bushes 33 and 37 are inserted in the central hole 40 of the cavity side disc cavity plate 39. This creates a magnetic circuit as shown on the left side in FIG. 2 (the north pole of the permanent magnet 44→the cavity side of disc cavity plate 39→the outer circumference bush 37→the south pole of the permanent magnet 44). This magnetic circuit generates attracting force between the holding means 45 for holding the inner circumference of the stamper plate and the cavity side disc cavity plate 39. The procedure for detaching the means 45 for holding the inner circumference of the stamper plate is the same as that for the first embodiment.

The stamper plate mounting device of the injection mold for the optical disc in accordance with the present invention has the following advantages over the conventional stamper plate mounting device.

Firstly, the means for holding the inner circumference of the stamper plate, to which a stamper plate has been attached, is securely held by the attraction given by the permanent magnet; therefore, the stamper plate does not come off as in the case of the example of the conventional vacuum suction type device.

Secondly, according to the present invention, there is no need to change the material of the disc cavity plate or to modify the heat transfer structure thereof as in the conventional device since the magnet is not buried in the surface of the disc cavity plate which corresponds to the signal bit area of the stamper plate.

Figure 3:
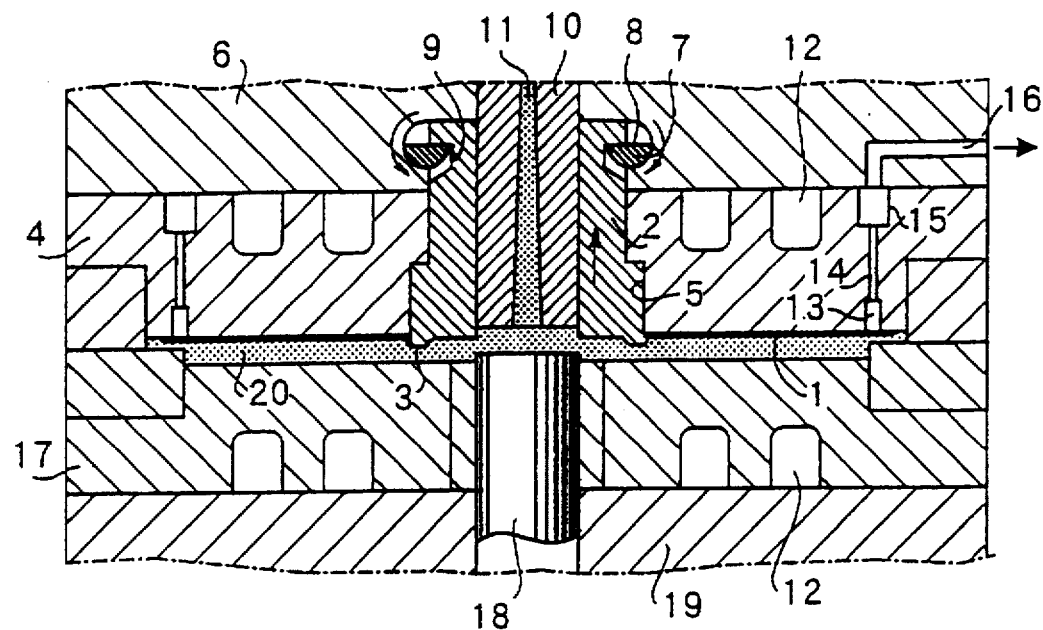
FIG. 3 is a schematic side cross-sectional view illustrative of resin being charged into an injection mold for making an optical disc substrate, which mold employs a stamper plate attaching and detaching device of an injection mold employing a stamper plate mounting device of a conventional optical disc substrate injection mold.
Figure 4:
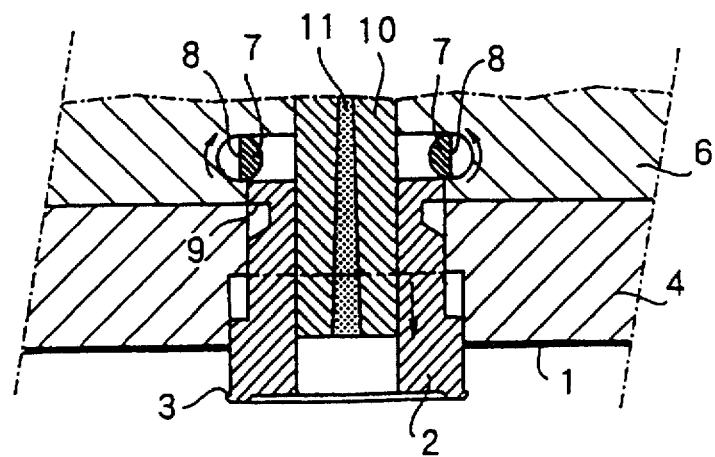
FIG. 4 is a cross-sectional view for illustrating how the conventional stamper plate of the optical disc substrate injection mold shown in FIG. 3 is removed.

Thirdly, unlike the conventional device shown in FIG. 3 and FIG. 4, the device according to the present invention does not require any mechanical driving system, thus making it possible to achieve a smaller, lighter metal mold and also to reduce the number of components.

In addition, a higher degree of freedom in designing makes it possible to create an injection mold for optical disc substrates which provides better performance.

The present invention can be embodied in other specific forms without departing from the spirit or essential characteristics thereof. In the embodiments described above, the stamper plate is mounted onto the cavity side disc cavity plate; however, the stamper plate may alternatively be mounted onto the movable disc cavity plate.

What is claimed is:

1. A stamper plate mounting device of an injection mold for making an optical disc substrate, the mounting device including a first cavity plate having a central hole in a surface thereof symmetrically located with respect to a longitudinal axis, at least a portion of the first cavity plate adjacent the central hole being ferromagnetic; a second cavity plate facing the first cavity plate to form a cavity therebetween, one of the first and second cavity plates being movable with respect to the other cavity plate; and a stamper plate having an aperture therein, an inner circumference of said stamper plate defining the aperture; comprising holding means having a first end fitting within the central hole and a second end, said second end having a flange for holding the inner circumference of the stamper plate against the first cavity plate, the aperture in the stamper plate being substantially coaxial with the central hole of the first cavity plate; and a magnet embedded in one of (a) the first cavity plate adjacent the first end of said holding means, and (b) the first end of said holding means, said magnet having magnetic poles extending in a direction parallel to the longitudinal axis, the stamper plate being drawn by said holding means toward the first cavity plate due to a magnetic force generated by the magnet acting on said holding means when the first end of said holding means is within the central hole of the first cavity plate.

2. A stamper plate mounting device according to claim 1, wherein said magnet is buried within the first end of said holding means adjacent the ferromagnetic portion of the first cavity plate.

3. A stamper plate mounting device according to claim 1, wherein said magnet is buried within the first cavity plate adjacent the first end of said holding means.

4. A stamper plate mounting device according to claim 1, wherein the magnet is a permanent magnet and comprises a material selected from the group consisting of a neodymium composition (Ne—Fe—B), samarium cobalt (Sm—Co), and alnico (Al—Ni—Co).

5. A stamper plate mounting device according to claim 1, wherein the first end of said holding means has an outside diameter surface which precisely fits within the central hole of the first cavity plate, and wherein said flange has a larger diameter than the outside diameter surface of the first end of said holding means.

6. A stamper plate mounting device according to claim 1, wherein said holding means further comprises:

an inner circumference bush having at the first end of said holding means an external thread on an outer surface thereof and an outside diameter surface fitting within the aperture in the stamper plate, said flange forming part of said inner circumference bush at the second end of said holding means and having a larger diameter than that of the aperture in the stamper plate; and an outer circumference bush having an internal thread for engaging with the external thread of said inner circumference bush, said outer circumference bush surrounding said inner circumference bush and fitting within the central hole in the first cavity plate.

7. A stamper plate mounting device according to claim 1, wherein the first cavity plate is fixed, and the second cavity plate is movable with respect to the first cavity plate.

8. An injection mold for making an optical disc substrate, said injection mold having a longitudinal axis, comprising:

a first cavity plate having a central hole in a surface thereof symmetrically located with respect to said longitudinal axis, at least a portion of said first cavity plate adjacent said central hole being ferromagnetic;

a second cavity plate facing said first cavity plate to form a cavity therebetween, one of said first and second cavity plates being movable with respect to the other cavity plate;

a stamper plate having an aperture therein, an inner circumference of said stamper plate defining said aperture;

holding means having a first end fitting within said central hole and a second end, said second end having a flange for holding the inner circumference of said stamper plate against said first cavity plate, the aperture in said stamper plate being substantially coaxial with the central hole of said first cavity plate; and a magnet embedded in one of (a) said first cavity plate adjacent the first end of said holding means, and (b) the first end of said holding means, said magnet having magnetic poles extending in a direction parallel to said longitudinal axis, the stamper plate being drawn by said holding means toward the first cavity plate due to a magnetic force generated by the magnet acting on said holding means when the first end of said holding means is within the central hole of said first cavity plate.

* * * * *